United States Patent
Bossdorf-Zimmer et al.

(10) Patent No.: US 10,029,680 B2
(45) Date of Patent: Jul. 24, 2018

(54) METHOD AND DEVICE FOR HANDING OVER A MOTOR VEHICLE TO THE DRIVER DURING AN AUTOMATIC PARKING SPACE-LEAVING MANEUVER

(71) Applicant: VOLKSWAGEN AG, Wolfsburg (DE)

(72) Inventors: Janine Bossdorf-Zimmer, Braunschweig (DE); Michael Wistrach, Braunschweig (DE); Dirk Stüker, Wedemark (DE); Thomas Weidner, Wolfsburg (DE); Roy Lamping, Braunschweig (DE); Frank Schwitters, Königslutter (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/314,292

(22) PCT Filed: Apr. 14, 2015

(86) PCT No.: PCT/EP2015/058039
§ 371 (c)(1),
(2) Date: Nov. 28, 2016

(87) PCT Pub. No.: WO2015/180886
PCT Pub. Date: Dec. 3, 2015

(65) Prior Publication Data
US 2017/0210377 A1    Jul. 27, 2017

(30) Foreign Application Priority Data
May 28, 2014   (DE) .................. 10 2014 210 172

(51) Int. Cl.
*B60W 30/06*    (2006.01)
*H04L 12/40*    (2006.01)
(Continued)

(52) U.S. Cl.
CPC ............ *B60W 30/06* (2013.01); *B60W 10/06* (2013.01); *B60W 10/18* (2013.01); *B60W 50/14* (2013.01);
(Continued)

(58) Field of Classification Search
CPC .. B60W 10/06; B60W 10/18; B60W 2710/06; B60W 2710/18; B60W 30/06;
(Continued)

(56) References Cited

U.S. PATENT DOCUMENTS 4,097,839 A * 6/1978 Lesiak .................. B60Q 1/143
                                                              315/82
6,564,123 B2 * 5/2003 Hahn ................. B62D 15/0285
                                                              701/1
(Continued)

FOREIGN PATENT DOCUMENTS

CN    102481953 A    5/2012
CN    102549632 A    7/2012
(Continued)

OTHER PUBLICATIONS

DE 10 2008051982, Eberhard et al. Translation, 2008.*
(Continued)

Primary Examiner — Tyler J Lee
(74) Attorney, Agent, or Firm — Barnes & Thornburg LLP

(57) ABSTRACT

A method and a device for handing over a motor vehicle to the driver during an automatic parking space-leaving maneuver performed by an automatic parking function. The method includes receiving an external parking space-leaving signal reflecting the driver's wish to get the motor vehicle out of the parking space, initializing the parking space-leaving maneuver and supplying an operating voltage to all vehicle components as a result of the reception of the (Continued)

parking space-leaving signal, carrying out the parking space-leaving maneuver from a parked position into a target position, switching off the voltage supply to predetermined vehicle components once the target position has been reached; and connecting the voltage supply to all vehicle components when the driver performs predetermined actions upon getting into the vehicle in the target position.

10 Claims, 2 Drawing Sheets

(51) Int. Cl.
  *G05D 1/00* (2006.01)
  *B60W 50/14* (2012.01)
  *B60W 10/06* (2006.01)
  *B60W 10/18* (2012.01)
(52) U.S. Cl.
  CPC ............ *G05D 1/0011* (2013.01); *H04L 12/40* (2013.01); *B60W 2710/06* (2013.01); *B60W 2710/18* (2013.01); *H04L 2012/40215* (2013.01)
(58) Field of Classification Search
  CPC ............ B60W 50/14; H04L 12/40; H04L 2012/40215; G05D 1/0011
  USPC ...................................... 701/2, 36
  See application file for complete search history.

(56) References Cited

U.S. PATENT DOCUMENTS

| | | | | |
|---|---|---|---|---|
| 6,802,573 | B2* | 10/2004 | Eberling | B60T 7/12 303/15 |
| 7,813,844 | B2* | 10/2010 | Gensler | B62D 15/0285 348/113 |
| 8,810,434 | B2* | 8/2014 | Groult | E04H 6/426 180/168 |
| 9,090,286 | B2* | 7/2015 | Rothoff | B62D 1/00 |
| 9,581,997 | B1* | 2/2017 | Penilla | G05D 1/0011 |
| 2002/0157889 | A1* | 10/2002 | Mackle | B62D 1/00 180/204 |
| 2003/0004613 | A1 | 1/2003 | Hahn et al. | |
| 2010/0274414 | A1* | 10/2010 | Park | B60W 30/06 701/2 |
| 2014/0222252 | A1* | 8/2014 | Matters | B62D 15/027 701/2 |
| 2015/0045991 | A1* | 2/2015 | Schwitters | B60W 30/00 701/2 |

FOREIGN PATENT DOCUMENTS

| | | |
|---|---|---|
| DE | 202005003955 U1 | 4/2006 |
| DE | 102008037813 A1 | 5/2009 |
| DE | 102008051982 A1 | 6/2009 |
| DE | 102009024016 A1 | 12/2010 |

OTHER PUBLICATIONS

Search Report for German Patent Application No. 10 2014 210 172.7, dated May 15, 2015.

Search Report and Written Opinion for International Patent Application No. PCT/EP2015/058039, dated Nov. 9, 2015.

Office Action for Chinese Patent Application No. 201580028196.8; May 2, 2018.

* cited by examiner

METHOD AND DEVICE FOR HANDING OVER A MOTOR VEHICLE TO THE DRIVER DURING AN AUTOMATIC PARKING SPACE-LEAVING MANEUVER

PRIORITY CLAIM

This patent application is a U.S. National Phase of International Patent Application No. PCT/EP2015/058039, filed 14 Apr. 2015, which claims priority to German Patent Application No. 10 2014 210 172.7, filed 28 May 2014, the disclosures of which are incorporated herein by reference in their entirety.

SUMMARY

Illustrative embodiments relate to a method for handing over a motor vehicle to the driver after an automatic parking space-leaving maneuver.

BRIEF DESCRIPTION OF THE DRAWINGS

The disclosed embodiments are explained below with reference to the drawings, in which.

DETAILED DESCRIPTION

Figure 1:
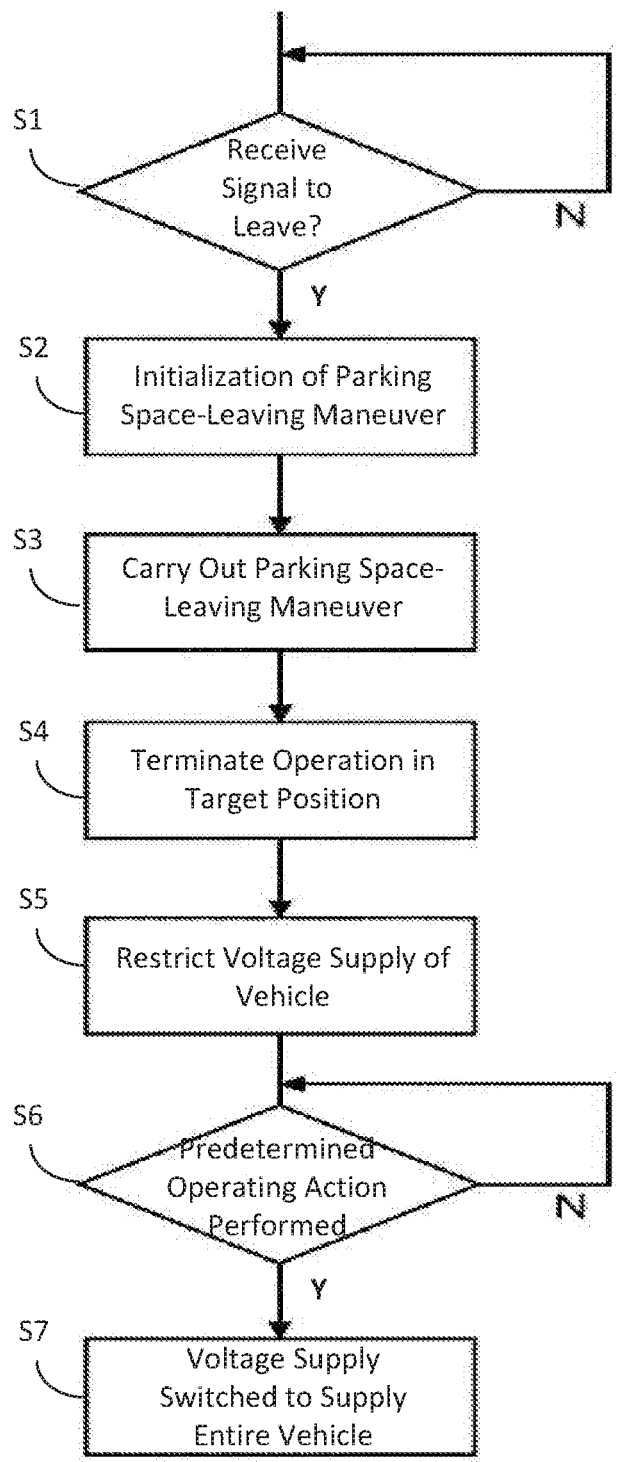
FIG. 1 shows a flow diagram of the method for leaving a parking space in a schematic illustration.

Parking a motor vehicle in a narrow parking space places particular demands on the driving ability of the driver of the vehicle. To facilitate parking in narrow parking spaces, systems which are controllable externally by remote control are known in which the driver can control parking from outside the vehicle.

In this regard, the document DE 10 2008 051 982 A1 describes a method and a device for remotely controlled maneuvering of a vehicle by means of a remote control device comprising a housing with at least one operating element and communication means for communication with the vehicle. In this case, in a first operating operation, an immobilizer is deactivated and the engine of the vehicle is started; in a second operating operation, the vehicle is braked by means of a service brake, a parking brake is released and a forward or reverse gear is engaged in the automatic transmission of the vehicle; and, in a third operating operation, the speed of the vehicle is regulated by means of the service brake. However, such systems do not allow the vehicle to be parked automatically, and parking is still dependent on the individual skill of the person doing the parking.

Modern driver assistance systems include systems for automatically parking a motor vehicle and causing it to leave a parking space. In this case, by means of an external remote control, the driver can initiate automatic parking in a suitable parking gap, wherein an environment sensor system ascertains the size of the parking space and continuously measures the environment during the parking maneuver. As a result, it is possible to park the vehicle in small parking gaps whose dimensions would prevent the driver from getting out of the parked motor vehicle. In this way, for example, the existing space for parking in a parking garage can be utilized more optimally. Causing the vehicle to leave the parking space is brought about by the driver once again from outside by means of the remote control. The driver's ability is no longer of importance with the automatic parking systems.

The document US 20030004613 A1 describes a method for automatically parking a vehicle in a parking gap, wherein the vehicle is brought to a suitable initial position near the parking gap by the driver and then the driver activates the first stage of the automatic parking function. Upon the activation of the first stage of the automatic parking function in the initial position, an environment sensor system detects the surroundings of the vehicle and thus the parking gap and calculates control data for parking the vehicle in the parking gap. Once the control data for parking the vehicle are present and parking in the parking gap from the initial position is able to be carried out, the driver can activate the second stage of the automatic parking function, and the vehicle automatically parks in the parking gap. In this case, the second stage of the automatic parking function can be activated from outside the vehicle; in other words, the driver can leave the vehicle before the actual parking maneuver, such that the vehicle can park even in narrow parking gaps. To enable the vehicle thus parked to maneuver out of the parking gap, the driver situated outside the vehicle can activate the automatic parking function, and the vehicle performs a parking space-leaving maneuver in the opposite direction substantially along the previous parking trajectory into the initial starting position. The vehicle remains in this position after leaving the parking space, and the driver can get into the vehicle again after having unlocked it.

If a vehicle is driven out of a narrow parking gap or garage in a driverless manner by means of remote control, the ignition has to be switched on for this purpose. A mechanism is thus started which involves firstly switching on the safety-relevant luminaires in the driver's field of view for a few seconds, for example, for steering, brake system, etc., to allow the driver to be satisfied as to the functioning of the luminaires. Since, in remotely controlled parking, this procedure takes place without the driver present, the driver can no longer perform this check since the duration of the parking space-leaving maneuver is significantly longer than the indication of the safety-relevant luminaires.

If the driver takes over the vehicle with the engine running after such an automatic parking space-leaving maneuver, then it must be ensured that the safety-relevant information of the vehicle and, if appropriate, a greeting scenario are displayed to the driver after getting in.

Therefore, the disclosed embodiments provide a method and a device for causing a motor vehicle to leave a parking space automatically, which method and which device take account of the safety-relevant aspects.

The disclosed method for handing over a motor vehicle to the driver during an automatic parking space-leaving maneuver by means of an automatic parking function performs the following operations:

receiving an external parking space-leaving signal reflecting the driver's desire for the motor vehicle to leave the parking space, initializing the parking space-leaving maneuver and supplying all vehicle components with operating voltage on account of the reception of the parking space-leaving signal, carrying out the parking space-leaving maneuver from a parked position into a target position, switching off the voltage supply to predetermined vehicle components once the target position has been reached, and connecting the voltage supply to all vehicle components when the driver performs predetermined actions after getting into the vehicle in the target position.

Once the vehicle has reached the target position, the operating voltage supply to predetermined vehicle components is switched off, which are activated again when the predetermined actions on the part of the driver are performed, wherein the voltage supply for the drivetrain is maintained. The driver can thus take over the vehicle in the operating state, i.e., with the engine running, wherein it is ensured that the safety-relevant indications are displayed to the driver after getting into the vehicle.

Optionally, the predetermined actions comprise an actuation of the brake and/or an actuation of the engine starter. It is also conceivable to implement a restriction to an actuation of only the engine starter or the brake, although the actuation of the brake ensures that the vehicle remains in the target position and, with the actuation of the engine starter, for the driver the situation is comparable to the normal start-up of the vehicle.

Further, the totality of vehicle components to be supplied with operating voltage is divided into two groups, namely first and second vehicle components, wherein the first vehicle components comprise at least the information units for informing the driver about safety-relevant states of the vehicle components, and the second vehicle components comprise at least the drive controller. In this way, there is a clear definition of which vehicle components are decoupled from the voltage supply once the target position has been reached after the parking space-leaving maneuver.

The disclosed device for handing over a motor vehicle to the driver during an automatic parking space-leaving maneuver by means of an automatic parking function, wherein the device is configured and designed to carry out the method as outlined above, comprises:

a unit for performing an automatic parking function, first vehicle components comprising at least the information units for informing the driver about safety-relevant states of the vehicle components, second vehicle components comprising at least the drive controller, a remote control for remotely controlling the automatic parking function, a control unit for communication with the remote control, and a unit for switching the supply of the vehicle components with operating voltage, wherein the unit for switching the operating voltage can switch the supply of the first vehicle components on and off whilst maintaining the voltage supply of the second vehicle components.

Further, the unit for switching the operating voltage is controlled by the control unit, wherein the unit for switching the operating voltage can be formed by a relay circuit, for example.

Further, the communication of the vehicle components among one another and with the control unit may be effected via CAN busses, wherein the CAN busses are connected to one another via a gateway. In this case, the control unit can be formed by a so-called body control module BCM, in which a large portion of the convenience functions is usually integrated.

With the method and the device outlined above, when a vehicle that has been caused to leave a parking space in a driverless manner is handed over to the driver, it is ensured that the safety-relevant information of the vehicle and, if appropriate, a greeting scenario are displayed to the driver, without the engine having to be restarted. The vehicle can therefore be taken over by the driver with the engine running.

FIG. 1 describes the sequence of the automatic parking space-leaving maneuver as a flow diagram. A first operation at S1 involves checking whether a signal for causing a motor vehicle (not illustrated) parked in a parking gap, for example, to leave the parking space automatically is present. In this case, the signal for leaving the parking space is generated by a receiving unit of the vehicle, which receiving unit receives a radio signal from a remote control which is situated outside the vehicle and which contains the driver's instruction to cause the vehicle to leave the parking space.

Once the signal for causing the vehicle to leave the parking space has been received in the first operation at S1, an initialization of the parking space-leaving maneuver is carried out in the second operation at S2, wherein, to supply the necessary control appliances, the entire vehicle, i.e., all vehicle components, is supplied with voltage. Furthermore, the initialization phase S2 involves starting the engine, monitoring the environment of the vehicle and determining the parking space-leaving trajectory, which can subsequently be corrected, if appropriate, during the parking space-leaving maneuver.

Once the parking space-leaving maneuver has been initialized in operation at S2, in the subsequent operation at S3 the actual parking space-leaving maneuver is carried out by engaging the gear, straightening the steering, releasing the brakes and slowly driving, wherein the parking space-leaving maneuver may be carried out straight on or according to the stipulation of a coarse target position by the driver on the latter's operating unit. Furthermore, the parking space-leaving operation at S3 involves adapting the parking space-leaving trajectory to current conditions. If obstacles occur, then the parking space-leaving maneuver is terminated.

Once the vehicle has reached its target position, the parking space-leaving maneuver is ended in operation at S4. In principle, the driver could then take over the vehicle with the engine running. However, the driver could then no longer perceive and check the safety-relevant information displayed after the engine was started.

Therefore, once the parking space-leaving maneuver has ended, the subsequent operation at S5 involves restricting the voltage supply of the vehicle to a few control appliances, such that essentially the components of engine, transmission and gear selector lever are supplied with voltage and the engine can continue to run, which should accord with the driver's desire to be able to take over the vehicle directly after the automatic parking space-leaving maneuver. Other control appliances are put into the passive mode or switched off, including the control appliances which are responsible for the safety-relevant luminaires.

For handing over the vehicle, which after the end of the parking space-leaving maneuver is in the "parking" mode, in which, under certain circumstances, specific driver actions may lead to the vehicle being kept in place by an electrical parking brake, the driver must perform predetermined operating actions to be able to take over the vehicle. Therefore, operation at S6 involves interrogating whether the driver has performed the predetermined operating actions. In the present example, this is the actuation of the engine start button and of the brake.

If the interrogation in operation at S6 is positive and the driver has performed the prescribed actions, then in operation at S7 the voltage supply of the vehicle is switched over again from the restricted voltage supply to the voltage supply for the entire vehicle. In the above example, this means that upon the actuation of brake and motor start button, by virtue of the cancellation of the restricted voltage supply of the vehicle, the control appliance of the safety lamps is activated again and the safety-relevant information is conveyed to the driver. The driver can now take charge of the vehicle.

Figure 2:
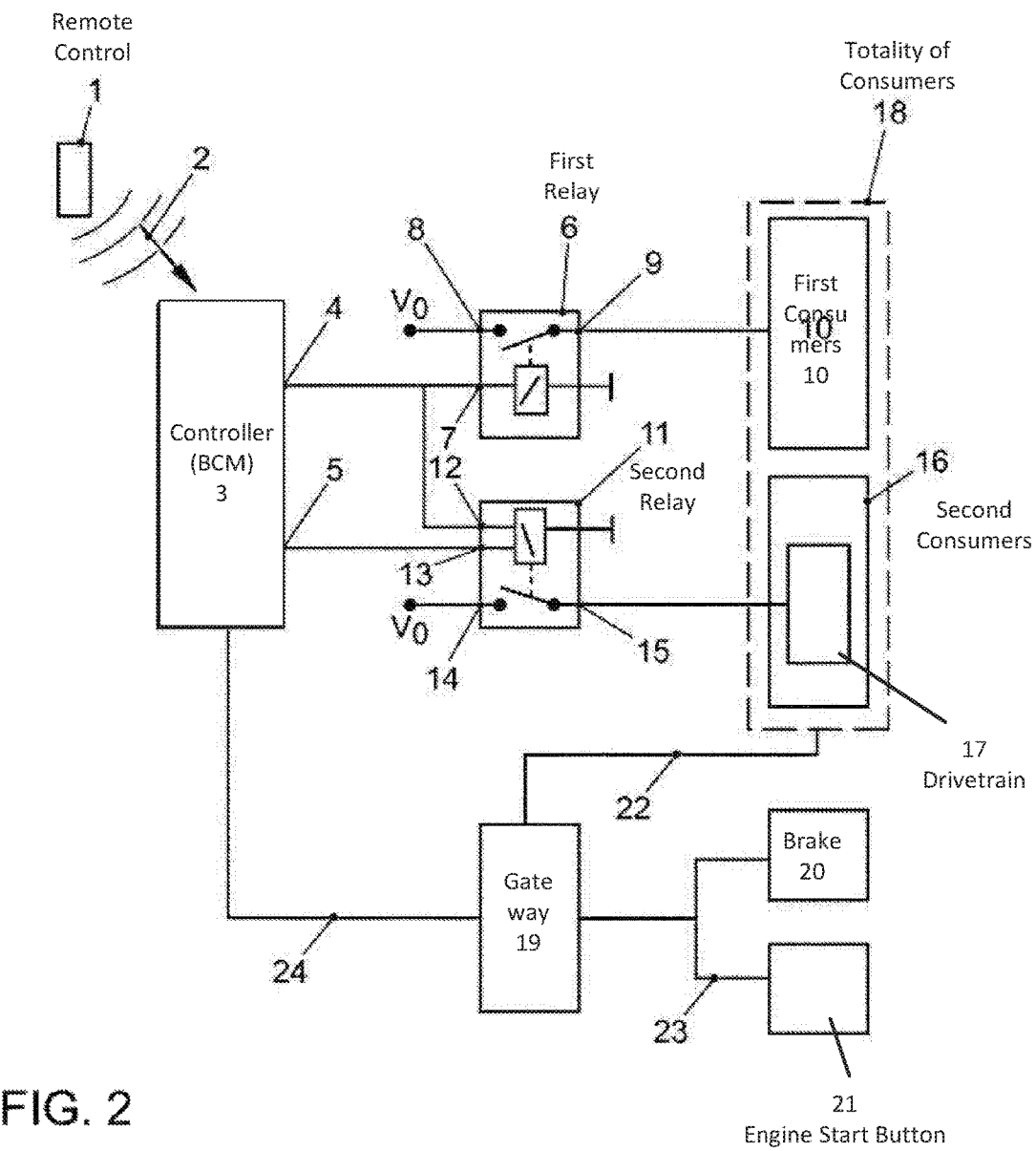
FIG. 2 shows a block diagram of the device for handing over the vehicle to the driver during an automatic parking space-leaving maneuver.

FIG. 2 shows a disclosed embodiment of the device for handing over the vehicle to the driver during an automatic parking space-leaving maneuver, with which the method illustrated in FIG. 1 can be realized. In this case, the hardware realization should be understood to be only by way of example and deviating realizations of the method are conceivable.

By means of a remote control 1, the driver of a parked vehicle sends a signal 2 to a controller 3 arranged in the vehicle to cause the vehicle (not illustrated) to leave the parking space automatically. The controller 3 can be realized, for example, by a Body Control Module, BCM for short, in conjunction with an automatic parking function.

To be able to drive the vehicle out of the parking gap, the entire vehicle must be supplied with voltage to perform the automatic parking space-leaving maneuver. Therefore, the controller 3 applies a control signal to the first output 4, which control signal brings about, in a first relay 6 at the control input 7, switching of the first relay 6, such that the operating voltage V0 present at the load input 8 of the first relay 6 is switched through to the load output 9 and the first consumers 10, combined summarily, in other words the group of the first vehicle components, are supplied with voltage.

In parallel therewith, the control signal present at the first output 4 of the controller 3 is applied to a first control input 12 of a second relay 11 to cause the operating voltage V0 present at the load input 14 to be switched through to the load output of the second relay 11 and thus to supply the block of the second consumers 16, in other words the group of the second vehicle components, with voltage.

In this case, the sum of the first and second consumers 10, 16 represents the totality 18 of the consumers of the vehicle, such that in this way the entire vehicle is supplied with voltage via the two relays 6, 11. The vehicle is therefore supplied with the necessary voltage for performing the automatic parking space-leaving maneuver. In this case, the first consumers 10 comprise, for example, the lighting and display instruments, convenience functions such as air-conditioning and infotainment. The second consumers 16 comprise the drivetrain 17, consisting of the engine controller, the transmission controller and the gear selector lever controller.

Once the parking space-leaving maneuver has ended, i.e., when the vehicle is in the target position in which the driver is intended to get into the vehicle and take over the vehicle, the reaching of the target position and thus the ending of leaving the parking space are communicated to the control appliance 3 via a first CAN bus 22, a gateway 19 and a second CAN bus 24 linking the gateway 19 and the controller 3. In this case, the first CAN bus 22 in FIG. 1 symbolically connects the totality 18 of the consumers to the gateway 19.

Upon obtaining the information about the ending of the parking space-leaving maneuver, the control appliance switches off the signal applied to the first output 4. This has the effect that the first relay 6 opens and the connection of the operating voltage V0 to the first consumers 10 is ended. In other words, the first consumers 10 are voltageless. Shortly before or at least at the same time as the switching off of the signal of the first output 4, the controller 3 switches a signal to the second output 5 of the control appliance, which is applied to the second control input 13 of the second relay 11. This brings about the maintenance of the switching through of the operating voltage V0 via the load output 15 to the second consumers 16, even though a control signal is no longer present at the first control input 12 of the second relay 11.

By means of this measure, one portion of the consumers 10 is switched off, while the other portion of the consumers 16, that is to say the controller of the drivetrain 17, is still kept under operating voltage. Consequently, the engine of the vehicle that has been caused to leave the parking space in the target position is not switched off and continues to run.

Once the driver has got into the vehicle, the driver must perform predetermined actions to put the vehicle once again into the state completely ready for driving. For this purpose, in this example, the driver must operate the brake 20 and the engine starter 21. By means of a third CAN bus 23, these predetermined driver actions are fed to the controller 3 via the gateway 19 and the CAN bus 24. The controller 3 thereupon again switches a control signal to the first output 4, as a result of which the first relay 6 closes again and the first consumers 10 are supplied with operating voltage. At the same time, the signal of the first output 4 is present at the first control input of the second relay 11. Therefore, switching off the second output signal 5 does not lead to a change in the switching behavior of the second relay 11, since the latter remains activated on account of the first output signal 4 and the second consumers 16 continue to have operating voltage applied to them.

The illustrated CAN bus configuration comprising first, second and third CAN busses 22, 23, 24 and gateway 19 should be understood to be only by way of example and serves only for elucidating the principle of the disclosed embodiment of the device.

Once the output signals of the controller 3 have been switched over to the first output 4, all vehicle components are supplied with voltage. In the course thereof, the safety lamps in the instrument cluster and, if appropriate, a greeting are activated for the predetermined period of time, such that the driver can fulfill his/her monitoring obligations.

LIST OF REFERENCE SIGNS

S1 Reception of parking space-leaving signals
S2 Initialization and voltage supply of entire vehicle
S3 Parking space-leaving maneuver
S4 Vehicle in target position
S5 Switch-over to partial voltage supply
S6 Interrogation regarding driver's operating action
S7 Switch-over to voltage supply of entire vehicle
N No
1 Remote control
2 Radio signal
3 Controller—BCM (Body Control Module)
4 Output 1
5 Output 2
6 First relay
7 Control input
8 Input for load voltage $V_0$
9 Output for load voltage
10 First consumers, group of the first vehicle components
11 Second relay
12 Control input 1
13 Control input 2
14 Input for load voltage $V_0$
15 Output for load voltage
16 Second consumers, group of the second vehicle components 17 Engine controller, transmission, selector lever (drivetrain)
18 Totality of the consumers
19 Gateway
20 Brake
21 Engine start button
22 CAN bus
23 CAN bus
24 CAN bus
$V_0$ Operating voltage

The invention claimed is:

1. A method for handing over control of a motor vehicle to the driver during an automatic parking space-leaving maneuver performed by an automatic parking function, the method comprising:
receiving an external parking space-leaving signal indicating the driver's desire for the motor vehicle to leave the parking space and, in response to the parking space-leaving signal:
automatically initializing the parking space-leaving maneuver and supplying all vehicle components with operating voltage in response to the reception of the parking space-leaving signal;
automatically carrying out the parking space-leaving maneuver from a parked position into a target position;
automatically switching off the voltage supply to predetermined vehicle components in response to the target position having been reached, wherein the method further comprises
connecting the voltage supply to all vehicle components in response to the driver performing predetermined actions after entering the vehicle while the vehicle is positioned at the target position.

2. The method of claim 1, wherein the predetermined actions comprise an actuation of the brake and/or an actuation of the engine starter.

3. The method of claim 1, wherein the vehicle components to be supplied with operating voltage are subdivided into first and second vehicle components, wherein the first vehicle components comprise at least the information units for informing the driver about safety-relevant states of the vehicle components, and the second vehicle components comprise at least the drive controller.

4. The method of claim 1, wherein switching off the voltage supply to predetermined vehicle components switches off voltage to information units for informing the driver about safety-relevant states of the vehicle components, and maintaining operating voltage to the drive controller when the target position has been reached, wherein the target position is a predefined position.

5. A device for handing over control of a motor vehicle to the driver during an automatic parking space-leaving maneuver by an automatic parking function, wherein the device receives an external parking space-leaving signal indicating the driver's desire for the motor vehicle to leave the parking space, and in response to such receipt, automatically initializes the parking space-leaving maneuver and automatically supplies all vehicle components with operating voltage in response to the reception of the parking space-leaving signal, automatically carries out the parking space-leaving maneuver from a parked position into a predetermined target position, and, in response to reaching the predetermined target position, automatically switches off the voltage supply to predetermined vehicle components once the target position has been reached, wherein the device automatically connects the voltage supply to all vehicle components in response to the driver performing predetermined actions after entering the vehicle in the target position, wherein the device comprises a unit for performing the automatic parking function, first vehicle components comprising at least the information units for informing the driver about safety-relevant states of the vehicle components, second vehicle components comprising at least the drive controller, a remote control for remotely controlling the automatic parking function, and a control unit for communication with the remote control, and
wherein the device has a unit for switching the supply of the vehicle components with operating voltage, wherein the unit for switching the operating voltage can switch the supply of the first vehicle components on and off while maintaining the voltage supply of the second vehicle components.

6. The device of claim 5, wherein the unit for switching the operating voltage is controlled by the control unit.

7. The device of claim 5, wherein the unit for switching the operating voltage is a relay circuit.

8. The device of claim 5, wherein the communication of the vehicle components among one another and with the control unit is effected via (Controller Area Network) CAN busses, wherein the CAN busses are connected to one another via a gateway.

9. The device of claim 5, wherein the control unit is a body control module.

10. The device of claim 5, wherein the unit for switching the operating voltage switches the supply of the first vehicle components on and off while maintaining the voltage supply of the second vehicle components in response to the motor vehicle reaching the predetermined target position.

* * * * *